No. 628,976. Patented July 18, 1899.
J. F. WITTHOLD.
MANURE DISTRIBUTING DEVICE FOR PLOWS.
(Application filed Jan. 3, 1899.)
(No Model.) 2 Sheets—Sheet 1.
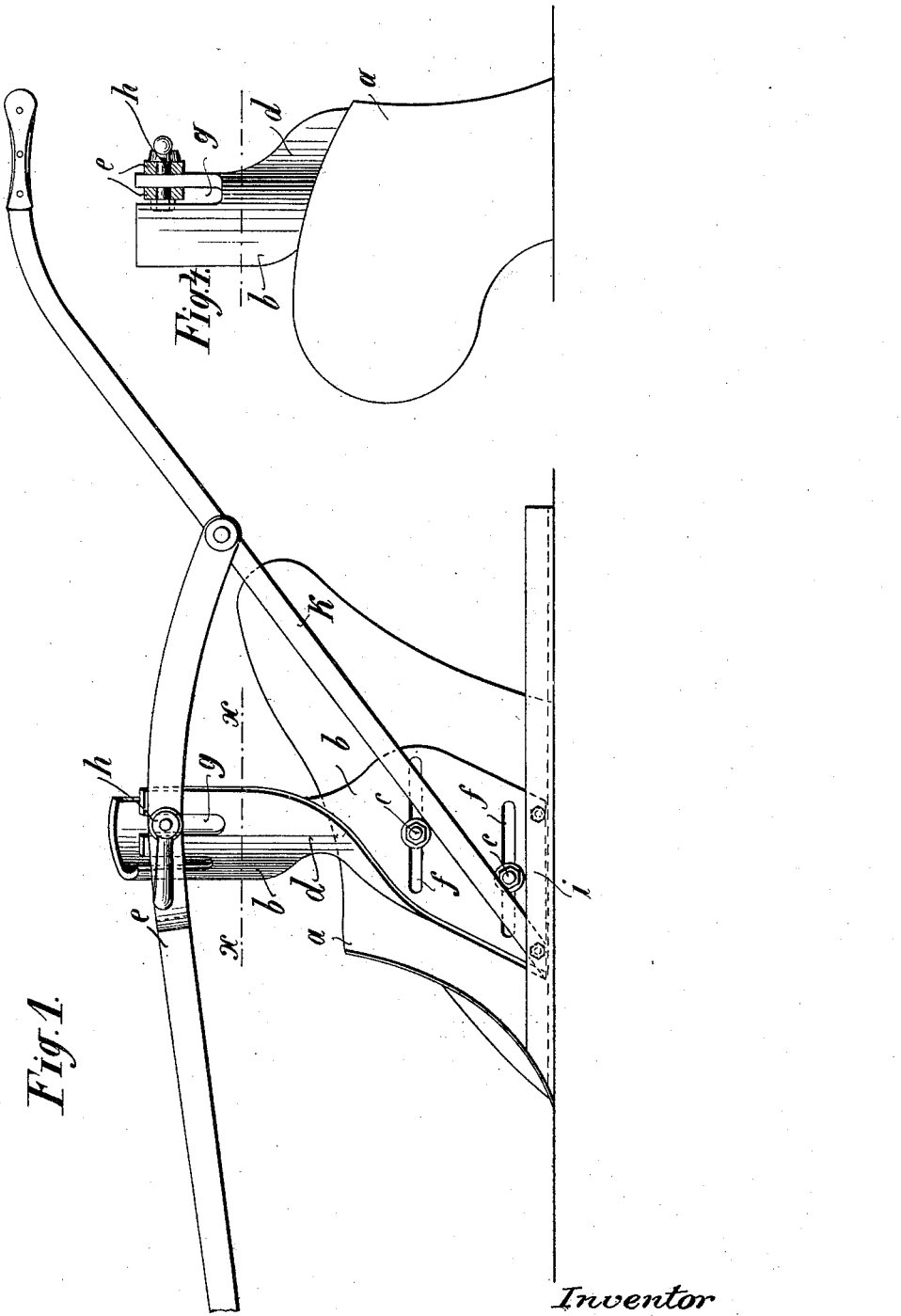
Witnesses
Geo. B. Blemming
L. M. Redman
Inventor
Johann F. Witthold
by Barlen & Barlen
his attys.

No. 628,976. Patented July 18, 1899.
J. F. WITTHOLD.
MANURE DISTRIBUTING DEVICE FOR PLOWS.
(Application filed Jan. 3, 1899.)
(No Model.) 2 Sheets—Sheet 2.
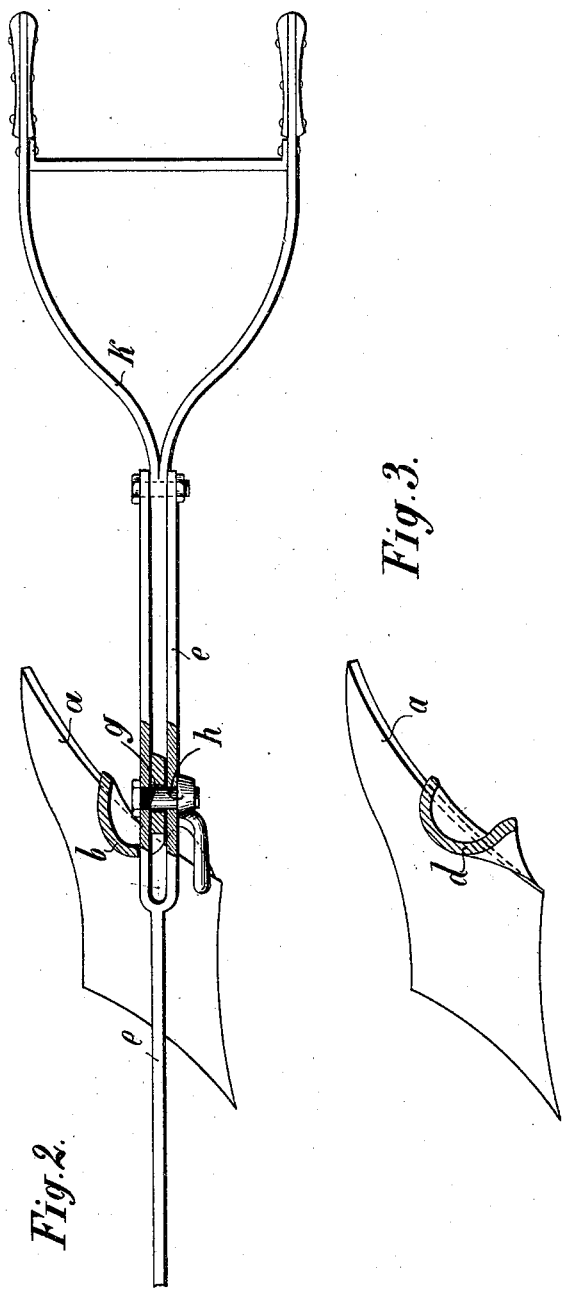
Witnesses:
Geo. B. Blemming
L. M. Redman
Inventor
Johann F. Witthold
by Barcroft & Barcroft
his attys.

United States Patent Office.

JOHANN FRIEDRICH WITTHOLD, OF DOHLEN, GERMANY.

MANURE-DISTRIBUTING DEVICE FOR PLOWS.

SPECIFICATION forming part of Letters Patent No. 628,976, dated July 18, 1899.

Application filed January 3, 1899. Serial No. 700,936. (No model.)

*To all whom it may concern:*

Be it known that I, JOHANN FRIEDRICH WITTHOLD, a subject of the Grand Duke of Oldenburg, residing at Döhlen, in the Grand Duchy of Oldenburg, Germany, have invented certain new and useful Improvements in Manure-Distributing Devices for Plows, (for which I have applied for a patent in Germany, dated December 3, 1898,) of which the following is a specification.

In the plows hitherto commonly used the disadvantage has been remarked that undivided clods, particles of manure, and the like get between the plowshare, share-holder, and plow-tree, which must be removed after a short time to enable the continuance of the plowing. A small cutter is sometimes used in front of the plowshare, but this does not, however, suffice to remove the disadvantage, which is the object of the present invention. The share-holder is given a special form, which acts like a wedge, so that the adherence of clods of earth or manure above the share of the plow cannot take place. By this arrangement the digging in of the manure by hand labor is rendered unnecessary, as this is effected automatically, which means a great economy of labor.

One form of the invention is shown in the accompanying drawings.

Figure 1 is a side elevation; Fig. 2, a plan of the plow, partly in section; Fig. 3, a sectional plan of the share of the plow on line $xx$ of Fig. 1; Fig. 4, a front elevation of the share, partially in section.

As will be seen from Fig. 1 of the drawings, the share-holder $b$ is attached to the share $a$ of the plow by means of bolts $c$. The share-holder $b$ has now above the share $a$ a spiral twist $d$, as will be seen from Figs. 1 and 3 of the drawings, which acts like a wedge upon the clods of earth and particles of manure raised by the share. By this means the adherence of anything below the plow-tree $e$ which could interfere with the action of the plow is avoided, and it is assured that a part of the manure raised be pressed into the furrow to be plowed.

The manure, which is distributed at the part $d$ of the share-holder $b$, is pushed toward the left and right, and on the right-hand side it falls into the neighboring furrow, whereas on the left-hand side it falls into the new furrow thrown up. The manuring of the furrows is regulated by providing the share-holder $b$ with slots $f$, in which the bolts $c$ can glide, which connect the share $a$ of the plow to the share-holder $b$.

The adjustment of the blade in a vertical direction is made possible by the slot $g$ in the top of the share-holder $b$, in which the plow-tree $e$ is adjustably secured by means of a nut $h$.

As usual, a shoe $i$, arranged at the bottom of the blade $a$ in the direction of the furrows, furnishes the guidance, whereas by means of the handles $k$ direction can be given to the plow.

The action of the plow depends upon the peculiar form of the share-holder $b$, by means of which the distribution, and the (as far as possible) frictionless movement of the earth and manure is effected.

I claim—

1. A plowshare-holder, having its upper portion above the plowshare spirally twisted to present a rounded front face; substantially as described.

2. A plowshare-holder having a spirally-twisted upper portion forming a rounded front face above the share, said holder having horizontally-extending slots in its lower portions containing adjustable bolts by which the share is secured thereto; substantially as described.

3. A plowshare-holder, having a spirally-twisted upper portion forming a rounded front face above the share and provided with vertical slots by which it is adjustably secured to the plow-tree; said holder having a share adjustably secured thereto; substantially as described.

In testimony whereof I have hereunto set my hand in the presence of two witnesses.

JOHANN FRIEDRICH WITTHOLD.

Witnesses:
W. P. LEONHARD,
AUGUST LÜHRS.